Patented Jan. 5, 1932

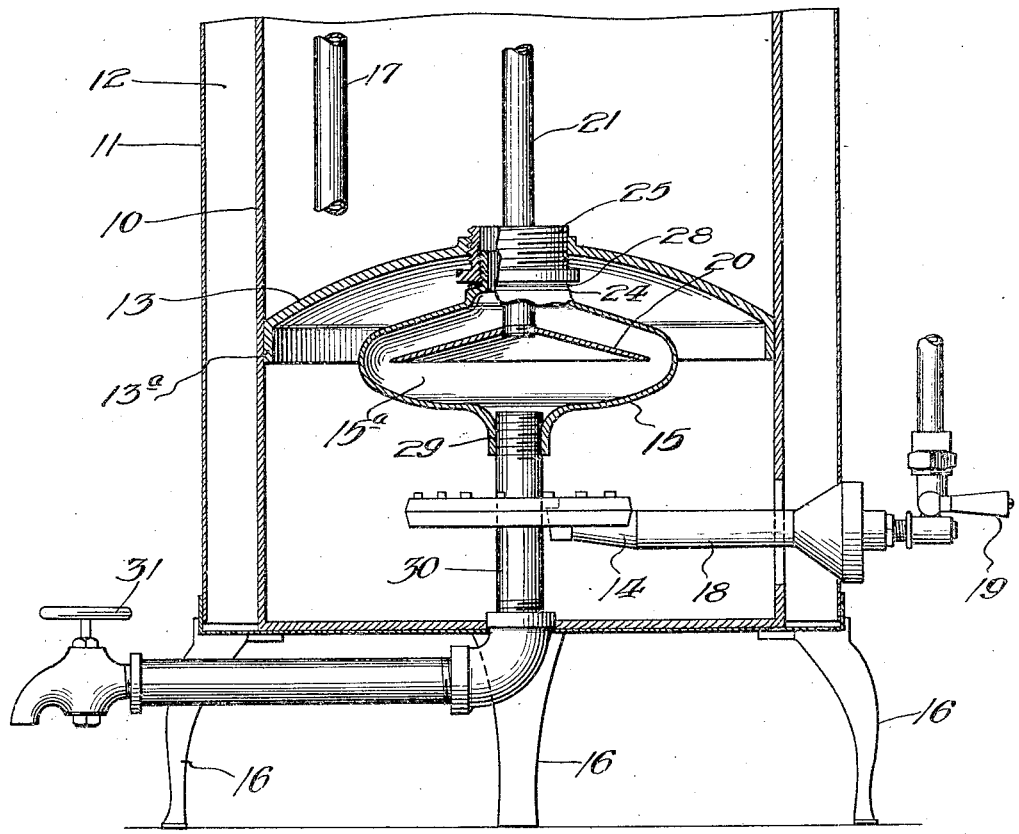
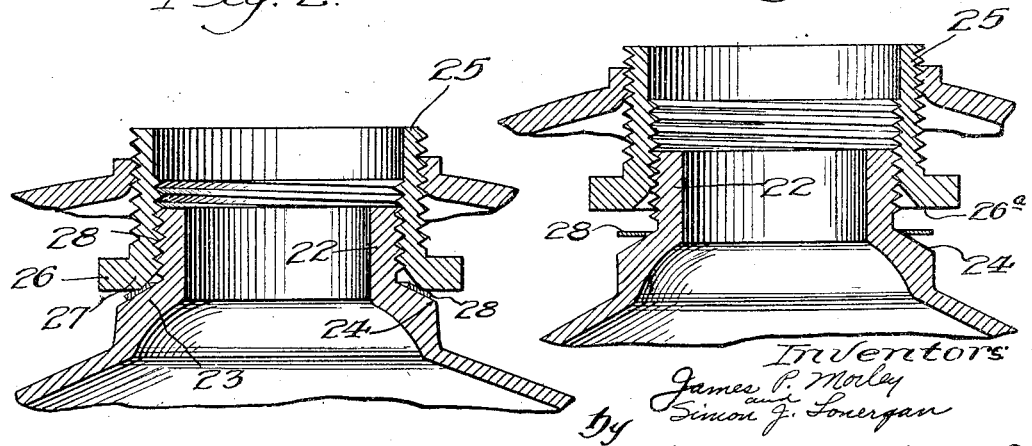

1,839,248

UNITED STATES PATENT OFFICE

JAMES P. MORLEY AND SIMON J. LONERGAN, OF LA PORTE, INDIANA, ASSIGNORS TO BASTIAN-MORLEY COMPANY, OF LA PORTE, INDIANA, A CORPORATION OF INDIANA

FLUID-TIGHT JOINT FOR WATER HEATERS

Application filed September 8, 1927. Serial No. 218,172.

Our invention relates generally to fluid-tight joints for water heaters and has to do particularly with establishing a fluid-tight joint between metallic heater members that are intended to be separated on occasions, especially the joint between a detachable heat-absorption element and the water storage tank with which such element directly communicates.

In water heaters of this character, it is highly desirable that various members, and particularly the heat absorbing element, which may be referred to as a spreader, be detachably mounted in such a way that they may be readily and quickly removed for cleaning or repairs or replacement. It is also necessary, for obvious reasons, that the joint between such members, and particularly that between the so-called spreader and tank, be fluid-tight. It has heretofore been attempted to accomplish the foregoing by means of an ordinary tapered or other screw thread connection only; however, this form of connection is not satisfactory because the action of the heat and water and corrosion causes the tightly fitting threaded parts to freeze and become fixed to such an extent that the members cannot be detached without injury to the parts, whereby maintenance cost is greatly increased, the life of the heater may be shortened and its overall efficiency may be impaired. The spreader joint particularly is generally located at such position as to not be readily accessible to tools which further renders such former joints objectionable.

The principal object of our invention is to provide for ready and quick detachment of the heater members, and particularly the heat absorption element or spreader and, at the same time, providing a fluid-tight joint between the detachable parts. To this end, we provide a loosely-threaded connection between these parts and the tank with independent and positively-acting joint-sealing means.

Another object is to provide a uniformly effective seal between the detachable parts and the tank which renders the joint fluid-tight regardless of the irregularities in the joint surfaces.

A further object is to provide a water heater of this character which is highly efficient in operation, simple in construction, and which may be readily and quickly repaired, and in which the parts subject to wear and deterioration may be readily replaced so that the maintenance cost is reduced to a minimum and maximum operating efficiency may be maintained over long periods of time.

Other objects and advantages will become apparent as this description progresses and by reference to the drawings, wherein,—

Figure 1 is a vertical section showing a portion of a water heater embodying our invention;

Fig. 2 is an enlarged detailed sectional view showing the manner of attachment of the spreader to the storage tank, as well as the manner of sealing the joint between these parts;

Fig. 3 is a view similar to Fig. 2, showing the parts in a partially assembled position and prior to screwing the spreader to its sealed position of Fig. 2.

Referring particularly to the drawings showing one form of our invention, the heater includes a tank of well-known form having an inner wall 10 and an outer wall 11 with an insulating space 12 therebetween. A concave bottom 13 is secured in a water-tight manner to the inner wall 10 by the downturned flanges 13ª. The tank walls preferably extend downwardly beyond the bottom 13 to provide a protected space for mounting the heater 14 and the spreader 15 therebeneath. The tank is supported by the usual legs 16. Cold water from the source is supplied to the interior of the tank through the pipe 17 and the hot water is withdrawn in the usual manner from the top of the tank through a service pipe (not shown). The heater 14 is supplied with fuel, in this instance gas, through an injector tube 18, the fuel supply being controlled by an ordinary valve 19 or any other desired means such as a thermostatic control.

The spreader 15 is preferably, but not necessarily, of the form shown in Fig. 1 and is made of metal arranged for the desired heat absorption efficiency. It is provided with a spreader chamber 15ª adapted to contain a small quantity of water and upon which the heat from the burner 14 directly acts. The spreader is also provided with the usual cone-shaped deflector 20 connected at its top to a pipe 21 extending to a point near the top of the tank. This deflector is diagrammatically illustrated in Fig. 1 and may be supported in the spreader in any desired manner. The spreader has its upper part extended to form a hollow cylindrical and exteriorly threaded neck 22, and, at the base of the threaded portion, it is increased in thickness to form a shoulder 23, the upper edge of which is tapered to form a conical seat 24 for a purpose to be described later. This seat 24 is finished to present a smooth and uniform bearing surface throughout.

The spreader 15 is carried by the tank bottom 13 which is provided with a suitable central threaded opening adapted to receive a bushing 25 which is threaded both internally and externally. The external threads of this bushing are preferably tapered and bear such relation to the threads of the opening in bottom 13 that as the bushing is screwed into place a tight joint is provided between the bushing and the tank bottom. This joint may, if desired, be further sealed by white lead or other pipe cement.

As stated hereinbefore, it is highly desirable that the spreader 15 be detachable at all times so that it may be readily and quickly removed for cleaning or repairs or replacement to insure the most efficient operation, and the joint between the spreader and the tank must be of a fluid-tight nature. We accomplish this as follows: The internal threads of the bushing 25 as well as the threads on the neck 22 of the spreader may be straight or tapered but loose fitting so as to provide a comparatively loose threaded and readily released connection. The threaded joint so formed is not of itself fluid-tight. The lower part of the bushing 25 is provided with an outwardly extending circumferential flange 26 which has its lower and inner edge cut away at an angle as at 27 to present a sharp and single line seating surface 26ª to the tapered seat 24 on the spreader. In assembling the spreader, a gasket 28 of comparatively soft material, preferably copper (lead or other soft material may be used) is first placed upon the spreader seat 24 in the manner shown in Fig. 3 and the spreader is then screwed into place to the position shown in Fig. 2. As the bowl is screwed into place, the sharp edge 26ª of the bushing flange first engages the upper surface of the gasket 28 and, as this action is continued, the gasket 28 is pressed down on the tapered seat 24 and then stripped, so to speak, down over such tapered seat surface so that it fits tightly and uniformly thereto. The sharp edge of the bushing 25 pierces the gasket and forms a single line contact entirely around the spreader seat. This arrangement, in addition to the stripping action above referred to, forms a tight seal between the bushing and the spreader and prevents escape of the water. This sealing action is also aided by the copper (or other gasket material) material being forced into intimate contact with the smooth seat surface and into the pores of the metal and low places on the seat by the stripping action and the direct action of the sharp edge of the bushing. This construction insures a uniform seating and sealing effect entirely around the spreader seat regardless of irregularities in the spreader seat or the bushing. It will be readily seen that the loose threaded relation between the spreader neck and the bushing permits of ready detachment of the bowl at all times while the independent joint-sealing means positively insures a fluid-tight joint between these parts at all times and does not in any way interfere with removal of the parts. This permits of ready removal of the spreader although the joint between it and the tank is not readily accessible for the use of tools.

The operation of the heater will be readily understood. The cold water, which is admitted through pipe 17 and which is in the lower part of the tank, flows downwardly through the bushing 25 and spreader inlet or neck 22 around the pipe 21 and to the under side of the cone-shaped deflector 20. The position of the burner 14 is such that the flame therefrom plays upon the under side of the spreader and quickly heats the small segregated quantity of water at that point. As this water is heated, it circulates, due to expansion, through the pipe 21 to the top part of the tank, the heated water being replaced by the inflowing cold water as described. This action is continuous as long as the heater is in operation. The lower part of the spreader 15 is provided with a threaded extension 29 which is connected to a drain pipe 30 controlled by a valve 31.

It is to be understood that, while we have described only one embodiment of our invention, we do not desire to be limited to the same as it is obvious that various changes and modifications may be made therein without departing from the spirit and scope of our invention as defined in the claims which follow. For example, we have shown and described the internally threaded part 25 as a separate piece, but, if desired, it may be formed as an integral part of the bottom 13, or it may be a part permanently welded to such bottom and, in each instance, it may be formed flush with the inner part of the bottom or extend above the same as shown.

We claim:

1. In a water heater having a storage tank and a heating element, a partition dividing the tank into a water receptacle and a combustion chamber respectively, a conduit connection between said partition and element which comprises a hollow exteriorly threaded member fixedly secured to the partition and normally non-rotatable therein, said hollow threaded member having an annular flange at its lower end provided with a sharp edge on one face, an upwardly extending threaded extension on said heating element adapted to loose-threadedly engage said threaded member and having a conical surface, and a metallic gasket disposed between said flange sharp edge and said conical surface and of such character and so disposed that when said member and element are screwed together, said sharp edge is initially imbedded in and grips said gasket to turn said gasket upon said conical surface to wedge and strip the latter down, on and in intimate contact with said conical surface, said conduit connection being located within the combustion chamber and relatively inaccessible and being exposed to the heat from the heating element, the loose-threaded connection between the heating element extension and the hollow threaded member permitting the heating element to be readily unscrewed and detached for cleaning or repair purposes without disturbing the threaded connection between the hollow member and the partition.

2. In a water heater having a storage tank with a combustion chamber therebeneath and having a water heating and circulating element in said combustion chamber adapted to be exposed directly to hot gases of combustion from a heating means; means for connecting said element to said tank for water circulating communication therewith comprising a hollow internally-threaded member having one end connected to said tank in said combustion chamber and so positioned as to be subjected to the heat of said hot gases of combustion, said hollow member having a lateraly projecting flange on its other end beveled to present an annular sharp edge, a hollow, exteriorly-threaded extension on said element in water circulating communication therewith which is also so positioned as to be subjected to the heat of said hot gases of combustion, said extension having an exterior conical surface and being adapted to loose-threadedly engage the interior thread of said hollow member, a soft metallic gasket disposed between said sharp edge and said conical surface and so related to said parts that when said hollow member and projection are screwed together said sharp edge is embedded in said gasket to strip the latter down over and into intimate seal contact with said conical surface; said connected parts all being subject to the heat of said hot gases of combustion and relatively inaccessible for detachment.

In testimony whereof, we have subscribed our names.

JAMES P. MORLEY.
SIMON J. LONERGAN.